Dec. 20, 1960 G. D. BALDWIN 2,965,750
VEHICLE LIGHT
Filed July 16, 1958
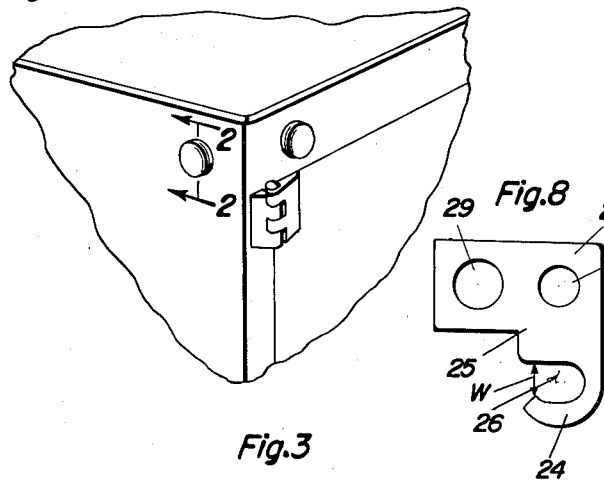
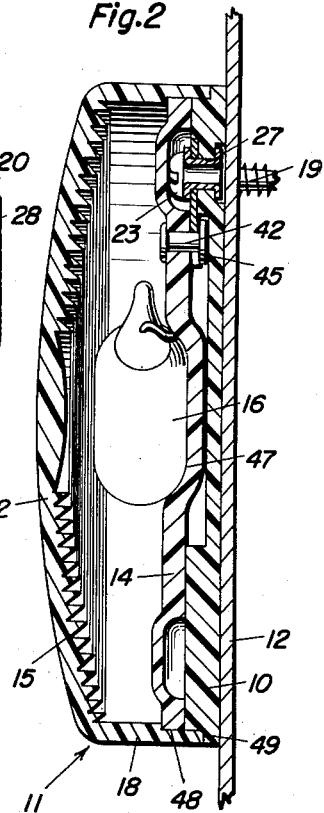
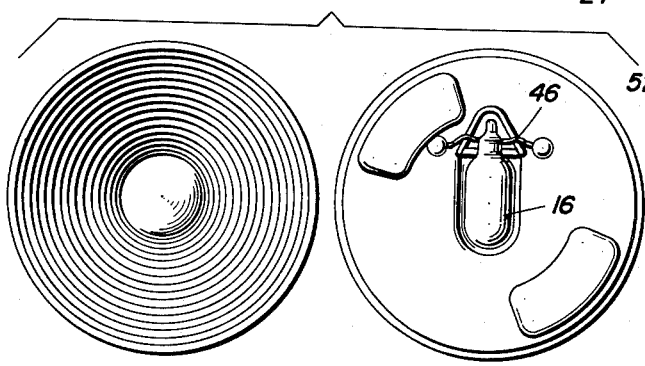
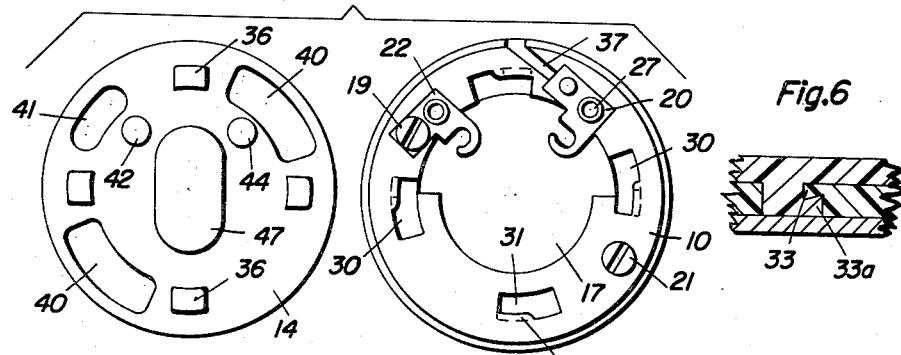
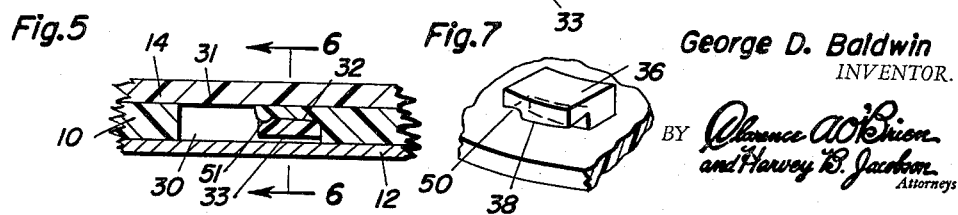
George D. Baldwin
INVENTOR.

United States Patent Office 2,965,750
Patented Dec. 20, 1960

2,965,750

VEHICLE LIGHT

George D. Baldwin, Jamestown, N.Y., assignor to Truck-Lite Co., Inc., Jamestown, N.Y., a corporation of New York Filed July 16, 1958, Ser. No. 748,956

6 Claims. (Cl. 240—8.2)

This invention relates to vehicle lights for an automotive vehicle or trailer or to lights attached to an object located near or on the road and it has special reference to the position or clearance lights of trucks, trailers and similar vehicles. Lights of this type have to be carried in relatively large numbers partly in order to outline the configuration of a moving or stationary vehicle for other users of the road and partly because the vehicle is generally used in interstate traffic and must conform to the regulations of all the states through which the vehicle passes.

It is of great advantage to so construct such lights that they are expendable which in this case means that they may be discarded after having served for the duration of the electric lamp bulb by means of which the light is produced.

It is the object of the invention to provide a vehicle light of the type above mentioned which fulfills a number of special conditions. The most important of these conditions are that the vehicle light should be of a simple construction, of light weight and of the smallest possible depth dimension so that it does not protrude from the body of the vehicle to which it is attached outwardly or inwardly. Further it is a most important condition to be fulfilled that the manipulation with which it is attached and detached must be a hand manipulation of the simplest kind.

A further object of the invention consists in providing a vehicle light of the above mentioned type which is weather and corrosion proof and which protects all those parts by means of which contact is made against the influence of atmospheric moisture and dust.

A further object of the invention consists in providing a vehicle light in which the means for mechanical attachment and the means for producing contact between the electric light bulb and the source of current are simultaneously attached and detached by the same hand manipulation, these two means cooperating to secure a safe and firm holding of the parts which is vibration and shock proof and a permanent contact.

The above mentioned reduction of the depth dimension of the vehicle light is of special advantage because the body of a truck or a similar vehicle usually fills the space permitted by law to the limit and every restriction of such space which may be due to the vehicle lights is considered as a loss. Interior projections are likewise most unwelcome as they frequently cause and suffer damage during unloading and loading and during movements of the objects which form part of the load during transportation.

According to the invention the vehicle light is of minimum depth, the depth dimension being just sufficient to produce a lateral visibility of the vehicle light for the observer whose line of sight is at right angles to the main axis of said vehicle light. Further, according to the invention the lamp carrying body is attached to a substantially imperforate vehicle wall by means of a flat wall plate carrying the mechanical means for the attachment of the removable lamp carrying body and the contacts connected with ground and the source of current respectively. Further, according to the invention the engagement of the contacts of the wall plate with the contacts on the lamp carrying body acts as a safety means preventing mechanical detachment of the removable lamp carrying body from the wall plate. Further, according to the invention the lamp carrying body is provided with protective means which, after attachment, prevent the penetration of atomspheric moisture and dust between the wall plate and the detachable lamp carrying body.

According to the invention the vehicle lamp consists essentially of molded synthetic resinous plastic and the lamp carrying body can be discarded together with the light bulb when the latter is no longer serviceable.

The vehicle lamp according to the invention thus produces a number of advantages which hitherto could not be obtained in this combination or could only be obtained singly by means of constructions which are more involved.

Further advantages and objects of the invention will be manifest from the following detailed specification.

The invention is illustrated in the accompanying drawings showing one embodiment thereof by way of example. It is however to be understood that the embodiment which has been illustrated has been selected to explain the principle of the invention and the best mode of applying said principle. Various modifications will suggest themselves to the expert skilled in the art in order to adapt the vehicle light described for different purposes and changes of this type even if they form a departure from the embodiment illustrated do not necessarily form a departure from the principle of the invention.

In the drawing:

Figure 1 is a perspective view of the body of an automotive vehicle or trailer carrying some of the clearance or position lights constructed according to the invention.

Figure 2 is a sectional elevational view of a vehicle light the section being taken along the line 2—2 of Figure 1.

Figure 3 is an exploded plan view of the two parts of which the light bulb carrying body consists.

Figure 4 is an exploded plan view of the base plate of the light bulb carrying body and of the wall plate respectively, showing the two faces of these two plates which come into contact upon attachment of the vehicle light.

Figure 5 is a fragmentary sectional view of the interengaging parts of the base plate of the lamp bulb carrying body and of the wall plate which is fixed on the wall.

Figure 6 is a fragmentary cross-section through the mechanical connection between the wall plate and the base plate of the light bulb carrying body the section being taken along line 6—6 of Figure 5.

Figure 7 is a fragmentary perspective view showing one of the attachment lugs.

Figure 8 is a plan view of one of the contact elements of the wall plate.

The vehicle light according to the invention consists essentially of a wall plate 10 attached to the wall 12 of a truck, trailer or other object and of the light bulb carrying body 11 proper which carries in its interior the light bulb 16. This light bulb carrying body 11 consists of a base plate 14 and of the lens body 15 which covers the front of the vehicle light but which is also provided with an axially and rearwardly projecting rim or flange 18 which permits to produce a closed casing enclosing light bulb 16 completely. All parts with the exception of the light bulb and the contacts to be described below are preferably made of a transparent resinous synthetic plastic which may be colored in the desired way.

The wall plate 10 is preferably a circular plate having a depression 17 in the center which for reasons which will appear later consists preferably of two semi-circular depressions communicating with each other but having a different diameter. The wall plate is held in place by means of screw bolts 19, 21 which are threaded into threaded bores of the vehicle wall 12. The wall plate carries two contact plates 20, 22 each of which has a flat plate-like body 25 from which a hook-shaped contact prong 24 projects. Between the contact plate and the prong a substantially U-shaped mouth opening 26 is left into which cylindrical contact studs 42, 44 connected with the light bulb may enter. This U-shaped mouth opening is however of less width W at its entrance than the contact studs and the remainder of the opening so that the contact studs 42, 44 in order to enter the opening 26 must press back and elastically deform the prong 24 in order to enter the opening 26 and to come to rest therein. Likewise, to withdraw the contact studs 42, 44 after they have been engaged in the opening 26 it is necessary to force the prong 24 back, elastically deforming the same.

Once caught within the opening 26 therefore the cylindrical contact studs 42, 44 cannot disengage themselves and are firmly retained in their position of contact.

The contact plates 25 are provided with openings 28 and 29 of which the opening 28 serves to accommodate a rivet 27 by means of which the contact plate is held on the wall plate. Through the opening 29 of contact plate 22 the screw bolt 19 may pass, the head of which thus rests on the contact plate and serves to retain the wall plate. Screw bolt 19 may also serve for grounding the contact 22 by means of the head which makes contact with the contact plate 22 and connects it with the wall, if the wall consists of metal. If it is desired to ground the contact at some other point, for instance because a vehicle wall does not consist of metal, a wire soldered to the end of the screw bolt 19 may connect the same with the point with which grounding is to be performed.

The opening 29 of the contact plate 20 leads to a channel 37 in the shape of a groove through which the live wire may enter. This wire may be soldered to the contact plate or may be held by means of the rivet 27.

For the purpose of making a mechanical connection between the wall plate 10 and the body 11 carrying the light bulb the wall plate is provided with arcuate undercut recesses, notches or depressions 30 which are best illustrated in Figure 5. The recesses or depressions 30 may either penetrate the wall plate completely or may only be cut to a certain depth.

Each notch, recess or depression 30 is completely open towards the top of the wall plate 10 on which the base plate 14 is fixed and is provided with an undercut portion 33 which covers about one-half of the notch or less, the undercut surface tapering slowly off in a circumferential direction, while in a radial direction it forms a kind of wedge 33 with the blunt end in front (Figure 6). These notches, recesses or depressions 30 with their undercut surfaces cooperate with lugs 36 projecting from the base plate 14 and integral therewith. The lugs have projecting portions forming catches with a notch engaging surface 38 which is inclined to engage the undercut surfaces of the notches and which therefore tapers in a circumferential direction while being wedge-like (at 33a) and dovetailing with the wedge-like portion 33 in the radial direction at right angles to the circumference. A locking projection 51 on the undercut portion and a groove 50 on the lug 36 may lock the parts when engaged preventing accidental disengagement. The width of a lug in a circumferential direction is about one-half of the width of a notch or less. In the example illustrated four lugs 36 are shown.

The base plate 14 is further provided with arcuate depressions 40 in the surface turned towards the wall plate 10 extending circumferentially, which depressions accommodate the protruding heads 23 of the screw bolts 19 and 21 and the heads of the rivets 27 holding the contacts 22. As the screw bolts 19 and 21 are in diametrically opposite positions the depressions 40 are likewise arranged in diametrically opposite positions on the base plate. The length of the arcuate depressions 40 is so selected that an angular movement of the base plate 14 is possible without lifting the base plate which is in contact with the wall plate 10.

A further somewhat smaller depression 41 is arranged in the base plate accommodating the head of the rivet of contact 20. Further, the base plate is provided with a central depression 47 on its front side facing the lens into which the light bulb 16 may be placed. The central depression produces a protrusion of the central portion towards the wall plate 10 which is however accommodated by the central depression 17 of the wall plate when the two plates are in actual contact. It will be noted that the prongs and the mouth openings of contacts 20, 22 project over the central depression 17 of the wall plate so that the heads of the contact studs may be accommodated in the depression 17 while engaged.

The two contact studs 42, 44 held by the base plate are of cylindrical shape and project slightly from the base plate on its underside turned towards the wall plate. They may be provided with flat heads 45 on both sides. The wires 46 of the bulb 16 are soldered to or otherwise connected with the said studs on one side and with the electric light bulb 16 on the other side.

The lens body 15 is placed over the base plate 14 after the bulb has been placed into the depression 47 and fixed therein and after the wires 46 of the light bulb 16 have been connected with the studs 42 and 44. The lens body is then permanently connected with the base plate so as to form a unitary structure with the same. For this purpose the lens body is provided with axial flanges 18 the ends of which have a stepped portion 48 into which the base plate fits snugly. By means of a suitable plastic solvent or by means of a suitable adhesive the lens body is united with the base plate so that both form a unit.

The ends of the flanges 18 project however beyond the base plate and fit snugly into a circular stepped portion 49 of the wall plate when the bulb carrying body is fixed on the wall plate. The projecting ends of the flanges therefore protect the contact surface between the base plate and the wall plate when the lamp is mounted against the penetration of atmospheric moisture and dust.

The axial flanges 18 of the lens body 15 are of limited length in order to make the vehicle light as flat as possible; they face the lamp bulb 16 and are of such length that light is emitted laterally. This light emission is of advantage as the position lights are thus also seen when looked at in a direction at right angles to the front surface of the lens. The position lights arranged on the side of the vehicle thus help in delineating the outline of the vehicle to a car approaching from the rear and they permit to observe the turning of the vehicle.

The lens 52 is of a conventional type with a substantially biconvex lens portion (one face of which is however nearly flat) in the center and a so-called Fresnel lens with serrations projecting inwardly surrounding the central portion.

It will be seen that the mechanical attachment of the light carrying body 11 consisting of the lens body 15 and the base plate 14 to the wall plate 10 occurs simultaneously with the engagement of the contacts 20, 22 on the wall plate with the contact studs 42, 44 on the base plate, while simultaneously with this double operation a complete enclosing of the two surfaces carrying the engaging members is obtained. All these operations are produced with a single limited angular rotational movement imparted to the light bulb carrying body. This movement causes a firm engagement which cannot be loosened by vibrations or by shocks by virtue of the cooperation between the fixation lugs and notches and the contacts.

When the light bulb carrying body is placed on the wall plate 10 in such a manner that the lugs 36 enter the notches or depressions 30 the underside of the base plate 14 is in firm contact with the wall plate 10 and the flanges 18 fit into the stepped portion 49 of the wall plate while the heads 23 with the screw bolts 19 and 21 and the heads of the rivets 27 fit into the arcuate depressions 40 and 41 respectively of the base plate 14. An angular movement of the body 11 thus brings the surfaces of the projections 38 of the lugs 36 into engagement with the undercut portion 33 of the notches or depressions, and during such movement the projections will dovetail with the undercut wedges 33a. The pressure is sufficiently heavy to prevent any disengagement by shocks or by constantly acting vibratory forces such as occur on a vehicle in motion. A complete fixation against any possible angular movement capable of disengaging the body 11 is obtained by means of the contacts 20 and 22. When forcing the studs 42, 44 into the U-shaped mouth 26 of the contacts it is necessary to elastically deform the prongs 24 of the contacts. The studs 42, 44 are thus caught within the mouth 26 of the contacts 20, 22 and prevent any angular movement which can only be performed if an elastic deformation of the prongs is produced. Such a deformation can however only be obtained by applying a local strong pressure in a strictly circumferential direction. Accidentally produced forces such as shocks and vibrations do not produce such a local pressure in a fixed direction and thus the light bulb carrying body 11 is firmly held on the wall plate without any danger of disengagement. The surfaces of the wall plate and of the base plate are pressed against each other by the wedge action and these surfaces are completely surrounded and protected by the ends of the flanges 18 engaging the step 49 of the wall plate.

It will be noted that the axial projection of all parts is extremely small. Therefore, the depth dimension of the vehicle light is a minimum. It is just sufficiently large to produce light on the lateral face which is necessary for a most complete utilization of the vehicle light enabling the same to indicate the vehicle position in two directions which are at right angles to each other.

Further it will be noted that the wall of the vehicle, truck or trailer does not show any perforation except those necessary to take up the screw bolts which however fill the perforations.

The vehicle light is thus reduced to its flattest possible shape but nevertheless simultaneously shows all the features which have been considered as desirable and which could not be obtained by other constructions and combinations. Each of these features, namely the complete flatness and the fixation in a way which excludes accidental disengagement, complete weatherproofness, complete absence of perforations in the whole wall were hitherto only obtainable separately by means of constructions which were more complex, at the expense of other advantages.

It will be clear that many minor departures from the construction may be made without in any way departing from the essence of the invention as defined in the annexed claims.

What is claimed as new is as follows:

1. A vehicle light for attachment to a substantially imperforate wall, comprising a wall plate mounted on the wall, provided with notches having undercut surfaces and further provided with contact plates each provided with a resilient projecting contact prong, encircling a U-shaped mouth opening having its narrowest portion near the entrance, a flat light bulb carrying unitary base plate of resinous plastic having a lens body attached thereto and defining a completely closed chamber, a light bulb within said chamber, contact studs projecting outwardly from said unitary base plate entering the mouth openings between the contact plates and prongs of the wall plate, said contact studs being of a slightly larger width than the entrance of the mouth openings, and attachment lugs with projections entering the notches in the wall plate and engaging the undercut surfaces upon imparting an angular movement to said light bulb carrying base plate.

2. A vehicle light as claimed in claim 1 wherein the contact plates are placed with their mouth openings along a circle and are angularly spaced, and wherein the contact studs projecting from the unitary light bulb carrying base plate are arranged in a circle having a diameter equal to that on which the mouth openings are placed, and wherein the said studs are so placed relatively to the attachment lugs that an angular displacement of the lugs, bringing them into engagement with the undercut surfaces, simultaneously brings the contact studs into engagement with the contact plates, said studs entering the mouth openings of the contact plates under elastic deformation of the prongs.

3. The vehicle light as claimed in claim 1 wherein the wall plate is fixed by screw bolts provided with heads, one of said screw bolts passing through a contact plate with its head resting on the same, and wherein the base plate is provided with arcuate recesses accommodating the screw bolt heads and of a length corresponding to the angular displacement of the said base plate relatively to the wall plate.

4. The vehicle light as claimed in claim 1 wherein the undercut surfaces of the notches and of the lugs are slanted in the direction of the angular movement so that the undercut surfaces slide on each other while the said undercut surfaces dovetail in a radial direction.

5. A vehicle light for attachment on a substantially imperforate wall comprising a unitary body of resinous plastic, said body consisting of a lens body and a base plate enclosing a completely closed chamber, said lens body having axial flanges permanently welded to said base plate, said flanges projecting beyond the base plate, a light bulb within the said chamber, contact studs passing through the said base plate to the outside of said unitary body and being connected on the inside of the chamber with the lens body, said contact studs being angularly spaced along a circle the center of which is coincident with the axis of the unitary body, fixation lugs with lateral projections, projecting outwardly from said base plate, said lugs being angularly spaced along a circle the center of which is coincident with the axis of the unitary body, a wall plate with recesses having undercut surfaces, said recesses being of an angular width approximately twice the width of the lugs, said recesses being angularly spaced along a circle of a diameter which is equal to that along which the lugs are spaced, contact plates with contact prongs attached to said wall plate encircling a mouth opening angularly spaced along a circle, in a manner identical with the spacing of the contact studs, said contact studs and lugs being detachably connected to the contact prongs and notches, respectively, and being so arranged that an angular movement of the unitary body brings the contact studs into engagement with the contact plates and prongs and the lugs into engagement with the undercut surfaces of the notches in the wall plate, said wall plate having a stepped outer rim over which the extended flanges of the lens body fit snugly, thus protecting the contacting surfaces of the base plate and the wall plate against atmospheric influences.

6. The vehicle light as claimed in claim 1 wherein the undercut surfaces and the lugs are provided with locking means, brought to engagement with each other preventing accidental displacement.

References Cited in the file of this patent

UNITED STATES PATENTS

| | | |
|---|---|---|
| 2,688,688 | Holtz | Sept. 7, 1954 |
| 2,825,799 | Julien | Mar. 4, 1958 |